F. A. RUNDLE.
CYLINDRICAL DRIER.
APPLICATION FILED APR. 27, 1910.
1,044,084.
Patented Nov. 12, 1912.
7 SHEETS—SHEET 3.
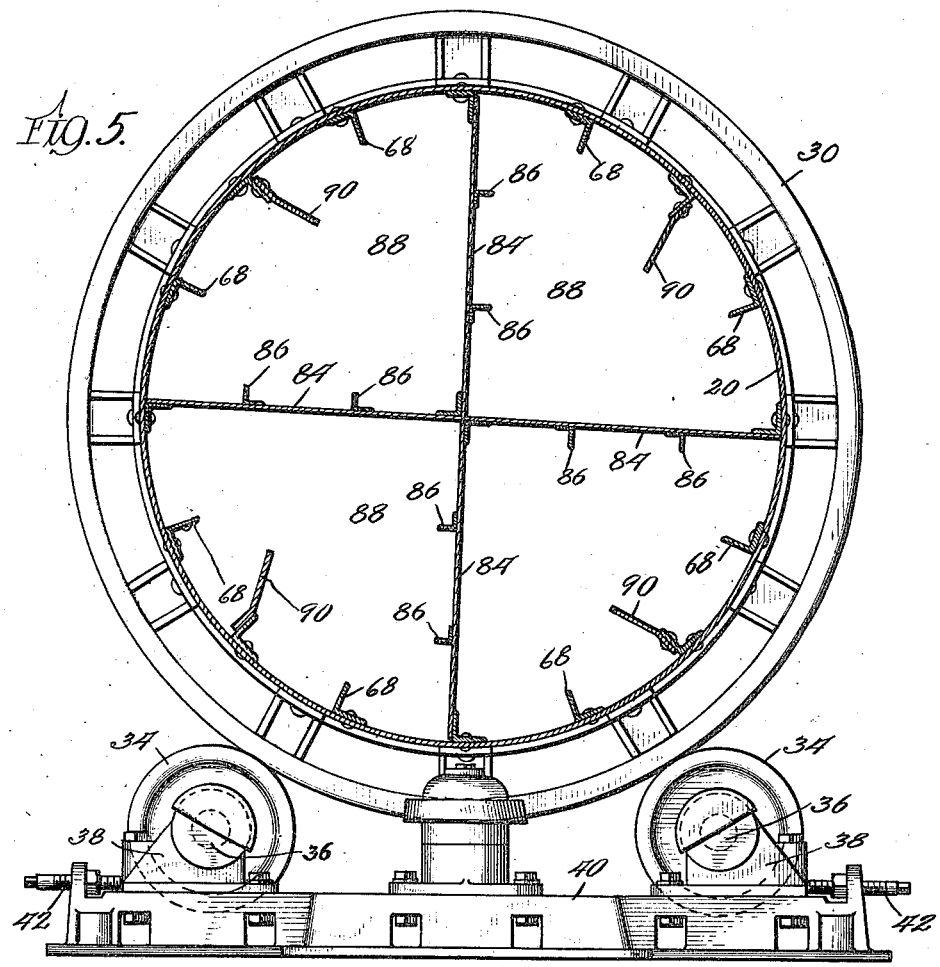
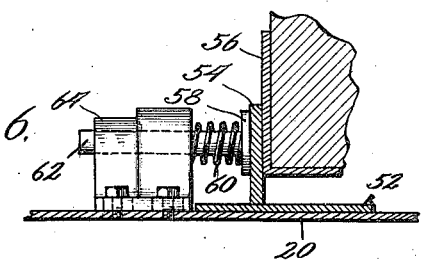
Witnesses:
Inventor:
Fred A. Rundle
By Cheever & Cox
Attys F. A. RUNDLE.
CYLINDRICAL DRIER.
APPLICATION FILED APR. 27, 1910.
1,044,084.
Patented Nov. 12, 1912.
7 SHEETS—SHEET 4.
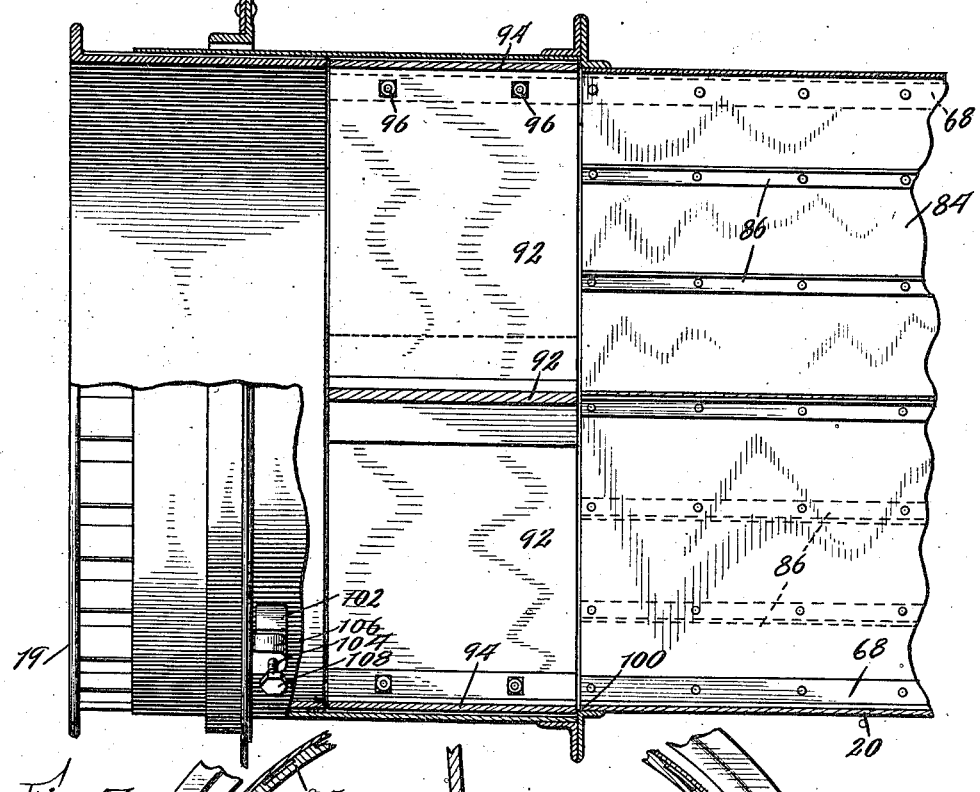
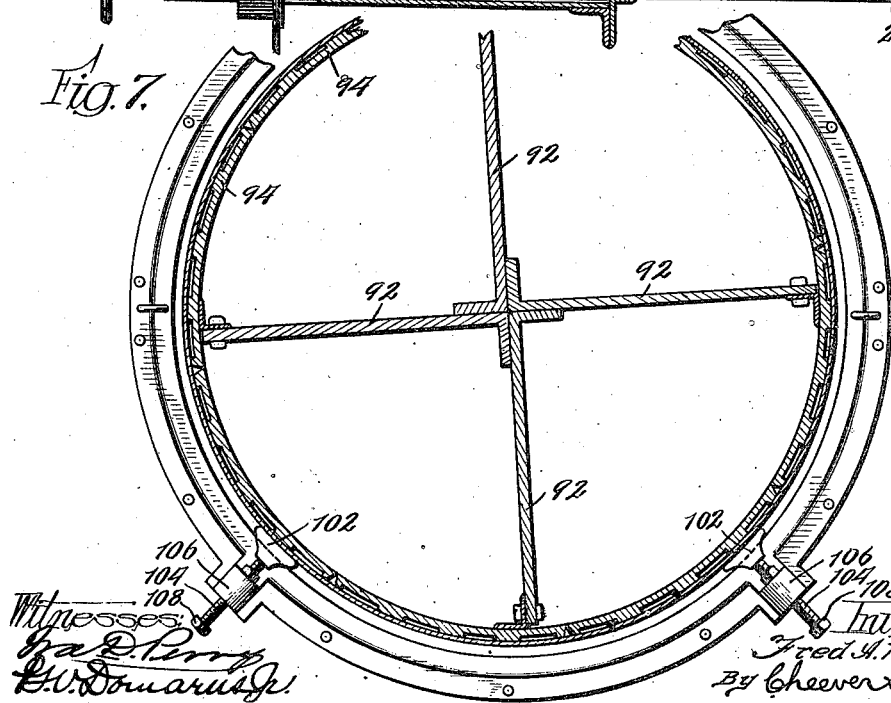

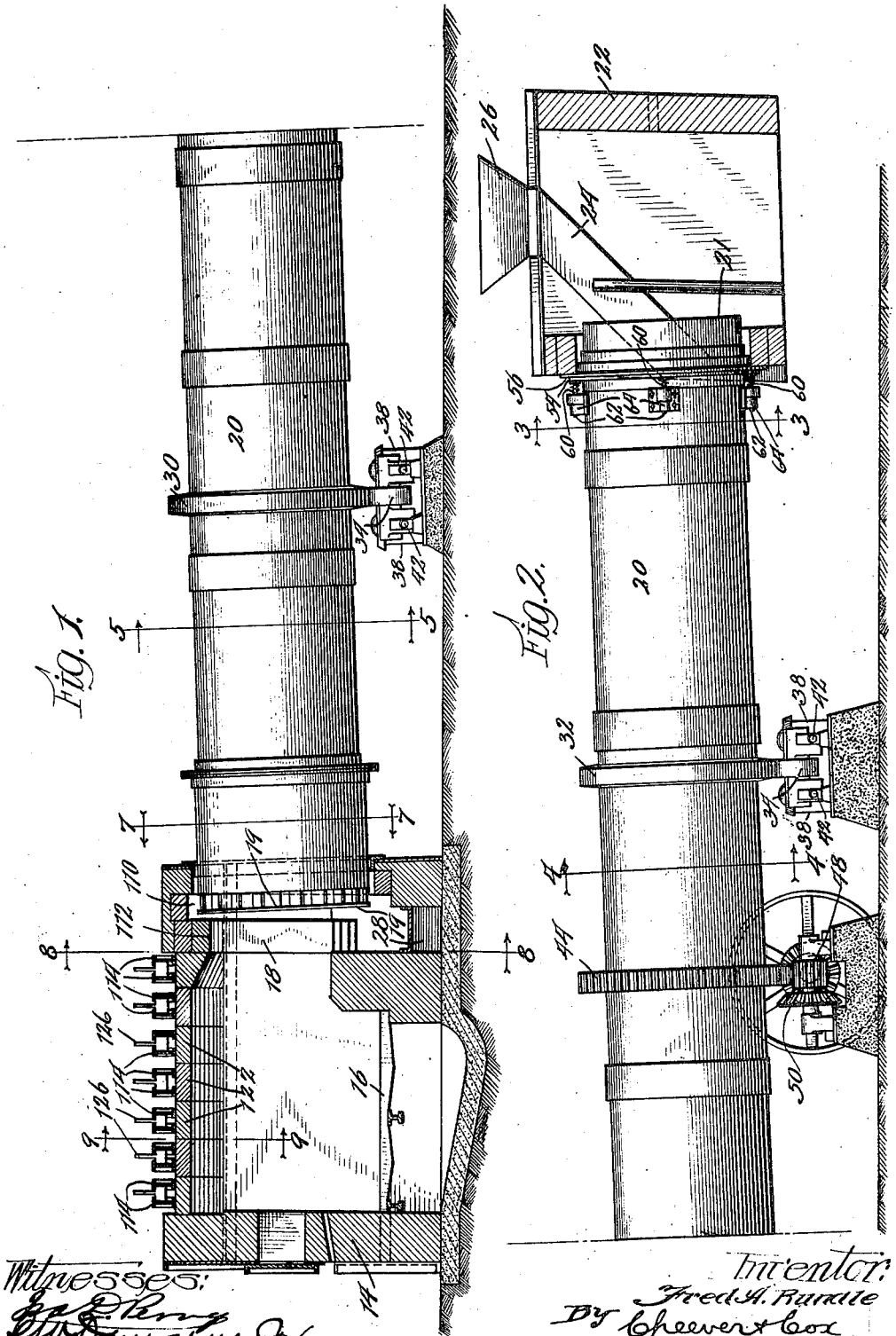

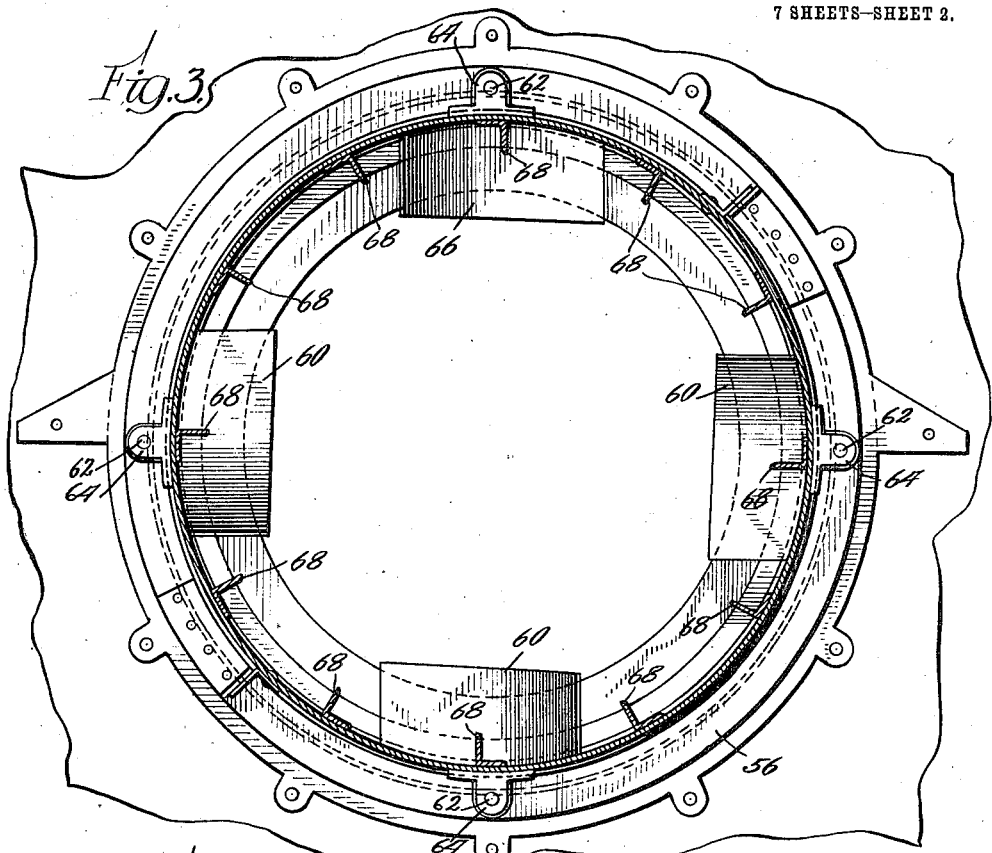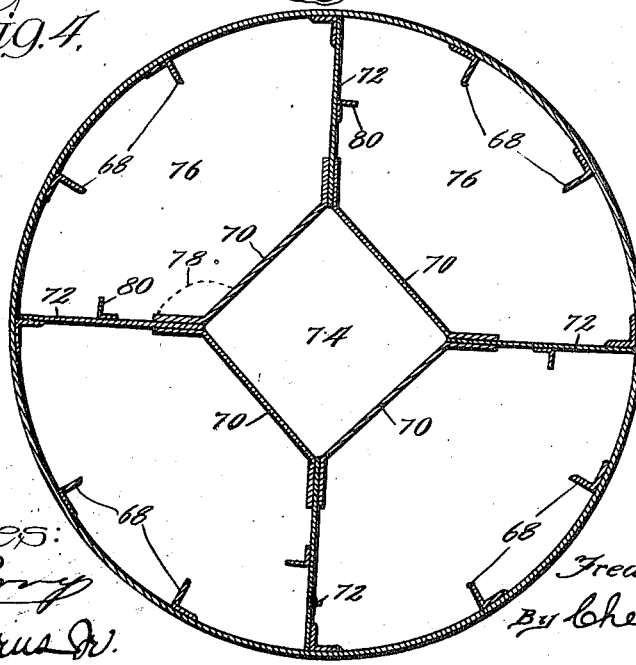

F. A. RUNDLE.
CYLINDRICAL DRIER.
APPLICATION FILED APR. 27, 1910.
1,044,084.
Patented Nov. 12, 1912.
7 SHEETS—SHEET 5.
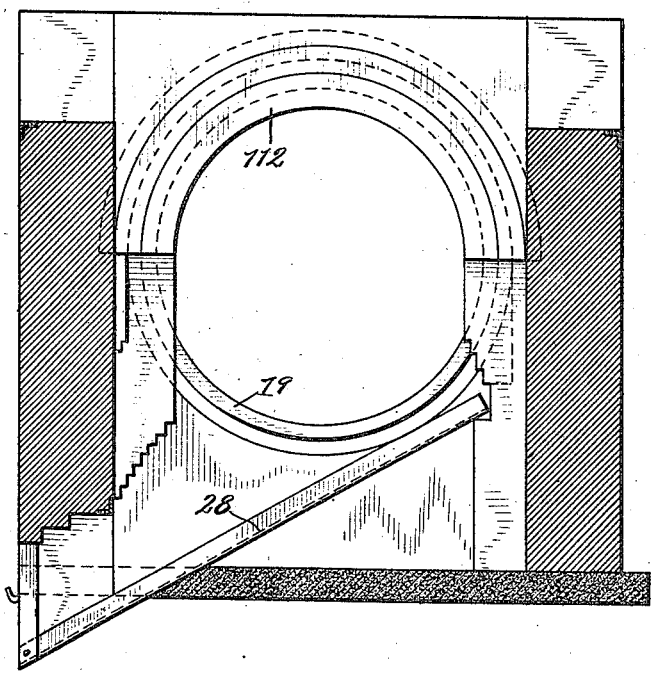
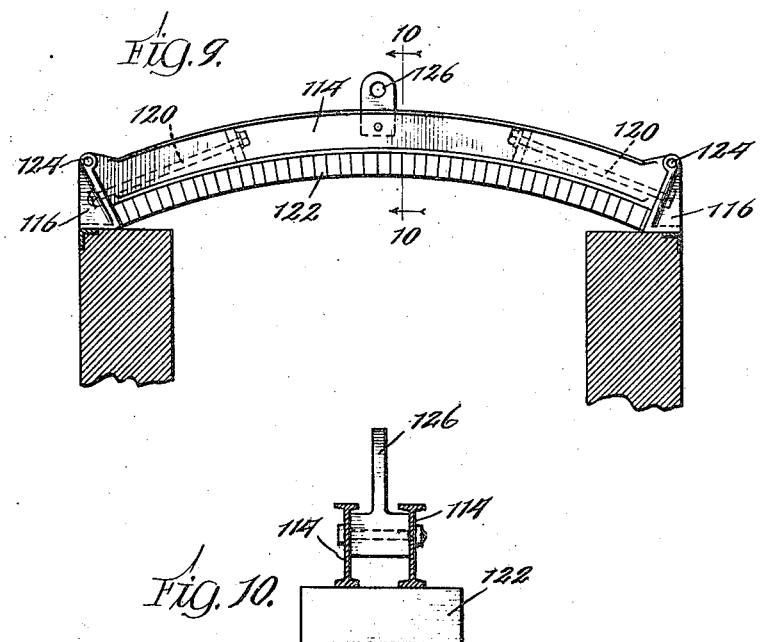

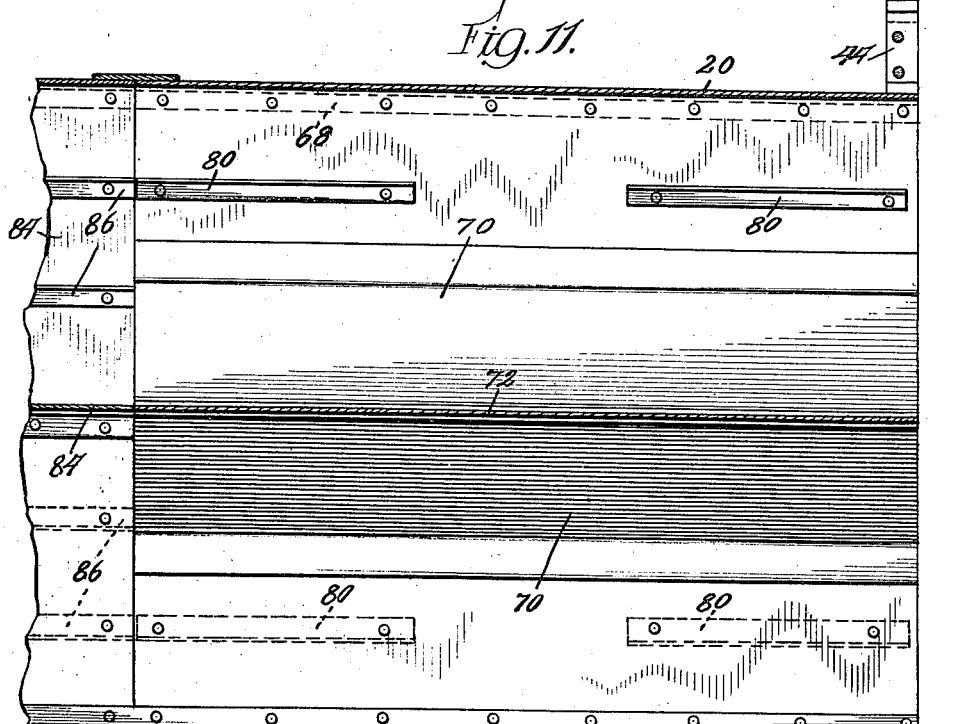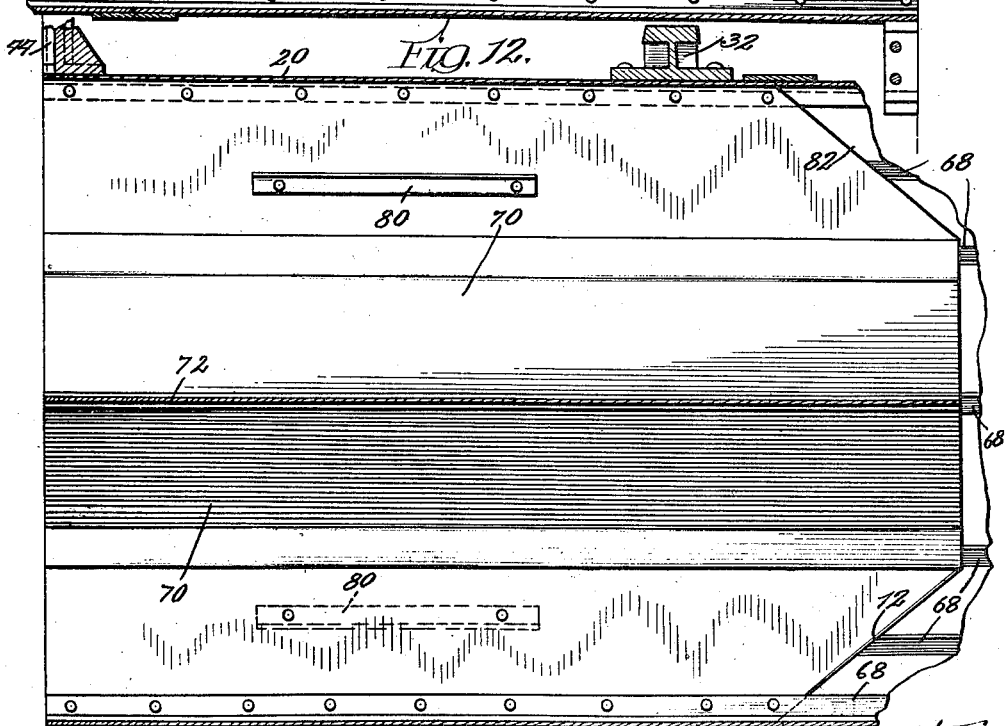

F. A. RUNDLE.
CYLINDRICAL DRIER.
APPLICATION FILED APR. 27, 1910.
1,044,084.
Patented Nov. 12, 1912.
7 SHEETS—SHEET 7.
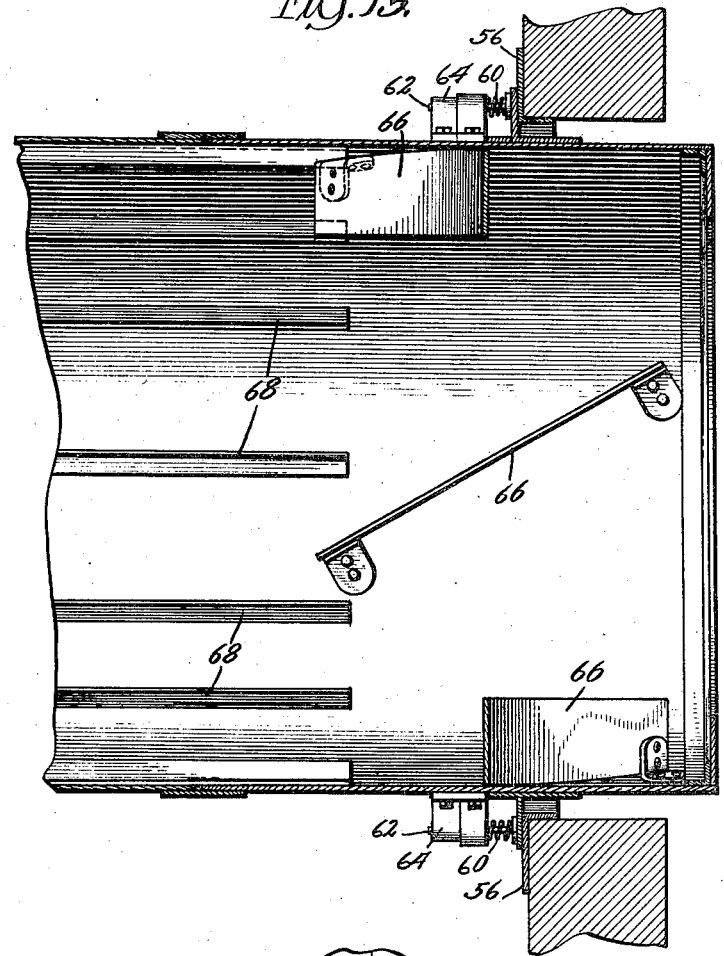
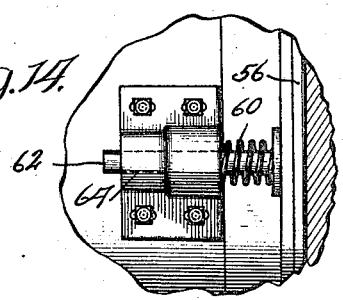

UNITED STATES PATENT OFFICE.

FRED A. RUNDLE, OF HARVEY, ILLINOIS, ASSIGNOR TO WHITING FOUNDRY EQUIPMENT COMPANY, OF HARVEY, ILLINOIS, A CORPORATION OF ILLINOIS.

CYLINDRICAL DRIER.

1,044,084.  Specification of Letters Patent.  Patented Nov. 12, 1912.

Application filed April 27, 1910. Serial No. 557,996.

*To all whom it may concern:*

Be it known that I, FRED A. RUNDLE, a citizen of the United States, residing at Harvey, in the county of Cook and State of Illinois, have invented a certain new and useful Improvement in Cylindrical Driers, of which the following is a specification.

This invention relates to cylindrical driers for use in drying rock, earth or mixtures thereof which it is necessary to dry before using for any purpose.

The object of the invention is to provide a device containing the improvements hereafter set forth which can be conveniently built and operated at reasonable expense without its being liable to get out of order.

The invention consists in the combination of parts hereafter specified and a connection between the cylinder proper and the dust chamber or breeching preventing the entrance of cold air, also in a combination of diaphragms and their feeding devices within the shell adapted to assist in carrying the material worked by the machine through the machine without its seriously sticking or otherwise clogging, this notwithstanding variations in degree of dampness of the material; also in the use of a removable and replaceable end section of the cylinder adjacent to the furnace or fire box so constructed that its end is protected somewhat from the direct heat of the furnace heat; also a novel construction of fire box roof permitting replacement thereof; also in details of construction to be hereafter more fully described and claimed.

Referring to the drawings, Figure 1 is a side view of the fire box or furnace end of apparatus illustrating the preferred form of this invention. Fig. 2 shows the left hand view of the device, or portion shown in Fig. 1, being the entire construction placed adjacent to and connecting the right hand end of the part shown in Fig. 1. Fig. 3 is a detail sectional view taken on the line 3—3, of Fig. 2. Fig. 4 is a sectional view on the line 4—4 of said figure. Fig. 5 is a sectional detail view on the line 5—5, Fig. 1. Fig. 6 is an enlarged detail view of parts shown just at the right of line 3—3, Fig. 2, for maintaining contact between the cylinder and the dust chamber. Fig. 7 is a sectional detail view on the line 7—7, Fig. 1. Fig. 7ª is a side view partially in section and partially broken away exterior of the portion of the cylinder where the line 7—7, Fig. 1, is taken. Fig. 8 is a detail sectional view on the line 8—8, Fig. 1. Fig. 9 is a detail view of one of the bungs of the roof of the fire box taken on the line 9—9, Fig. 1. Fig. 10 is a detail view of the same roof bung on the line 10—10, Fig. 9. Fig. 11 is a central sectional detail view of the interior of the cylinder immediately at the left of where the section line 4—4, Fig. 2 is taken and Fig. 12 is a similar interior view immediately at the right of said section line. Fig. 13 is a sectional view of the head end of the cylinder. Fig. 14 is a plan of the parts of Fig. 6.

The device broadly stated consists in a fire box 14 having grate bars 16 and a discharge opening 18 entering one end 19 of a long cylinder 20 adapted to be rotated by mechanism to be hereafter described. The discharge end of the cylinder 21 entering a dust chamber 22 and itself entered by a chute 24 having at its upper end a hopper 26 in which the material to be dried is placed for the purpose of passing into and down the inclined cylinder, the material in so doing coming into contact with the hot gases and to a limited extent the flames produced by the fire upon the grate 16, said material thus being dried and finally running down the incline 28 provided for the purpose. The cylinder 20 is provided with two exterior rings 30 and 32 each of them mounted upon suitable rollers 34 journaled at 36 upon bearing castings 28 adjustable crosswise of the cylinder from the base plates 40 under the control of adjusting screws 42 in the ordinary manner.

The invention is equally useful in connection with devices old in the art and frequently used for drying fish in which the feeding and firing takes place at the same end of the cylinder. Upon the surface of the cylinder is also mounted a gear 44 meshing with a pinion 46 and other intermediate gearing 50 connected to any suitable power adapted to give approximately continuous rotation, as is desired. Near the forward or feeding end of the cylinder is a circular band or ring 52 on which is slidably mounted another ring 54, lying in a plane at approximately right angles to the cylinder and slidable relative to the plate 52. This plate 54 lies adjacent to the said wall 56 of the dust chamber 22 and is held in contact therewith, particularly during the rotation of the cylinder by the plunger heads 58 controlled by the springs 60 inclosing the piston rod 62 located between the piston heads 58 and the stationary block mounting 64. The result of this construction is that the springs 60 and parts operatively connected to them keep the plate 54 in contact with the wall 56 and also with the cylinder, thereby preventing the entrance of cold air through the opening which would otherwise be left between the cylinder and the box 22.

The interior of the cylinder immediately adjacent to the feeding end is provided with a plurality of angularly placed angle bars or equivalent members 66 adapted to, as the cylinder rotates, stir up the material to be dried and to feed it along onto the longitudinally placed angle irons 68 placed in the portion of the top immediately adjacent thereto. In practice these angular members 66 on the cylinder, of say for illustration six feet in diameter, occupy a longitudinal distance of approximately three feet and the members 68 occupy a longitudinal distance of approximately forty-three feet. Aside from these projecting members 68 this portion of the cylinder is clear of mechanical construction. About eight feet from the right hand or feeding end of the illustrative cylinder above referred to, the interior of the cylinder is provided with a cross section such as is illustrated in Fig. 4, comprising a box shaped member 70 connected to the cylinder walls proper by radial members 72, thus forming in the interior of the cylinder a central tube 74 of approximately square cross section through which some of the hot gases are intended to pass and four other passageways 76 of irregular cross section through which the gas passes in one direction and the material to be dried passes in the opposite direction. Particular attention is here called to the oblique angles 78 formed between the walls of the blocks 70 and the radial members 72, which angles tend to prevent sticking of material thereto, which sticking is further prevented by the fact that the material in the passageway 76 is being rotated at a distance from the center of the cylinder and is at such a distance therefrom that there is sufficient centrifugal force to throw the material off from the walls of the passageway 76 and thus keep it agitated and present the particles to the action of the hot gases. The stirring up of the material or rock to be dried while passing through these passageways 76 is assisted by the angular members 80 as well as by members 68 heretofore described.

In order to insure the delivery of the material to be dried into the passageways 76 the forward ends of the plates 72 are cut away in the angular lines, as best seen in Fig. 12, the angularity of said lines extending from the center toward the sides of the cylinder and in the direction in which the material is passing through the cylinder. This cross section construction just described is somewhat expensive to make and as it is only needed while the material to be dried possesses a certain amount of moisture, it is, therefore, only continued along the cylinder of the illustrative size given for about thirteen feet after which the section illustrated in Fig. 5 is provided, consisting of radial members 84, with projecting angular member 86 designed to assist in stirring up the material which passes through the four triangular passageways 88. To assist in this stirring up additional longitudinal angular members 90 are provided upon the circumference of the interior of cylinder. This construction of the section of the cylinder continues for about twenty feet or to the last section illustrated in Fig. 7, in which the material worked upon is sufficiently dry so that the angular stirring members may be omitted and the section consists of extra heavy radial members 92 and the removable lining members 94 secured to the interior of the device by bolts 96 or other suitable devices. Attention is called to the fact that these members 94 are of such a thickness that, as illustrated in Fig. 7, they come out flush with and protect the ends 100 of the material of the cylinder 20, so that the hot gases may pass along the interior portion 94 and into the interior of the next section i. e., passing the end 100 thereof without getting unduly in contact with said end 100 and tending to melt it off.

In the prior devices of this kind it has been found that when the rotation of the cylinder is stopped for any purpose while the fire in the fire box is burning, the heat is liable to cause sagging of the overhanging end of the cylinder until it comes in contact with the thimble protecting the opening in the wall of the furnace with the result that when it is attempted to start up the machine the cylinder is apt to damage the furnace wall. In order to prevent this sticking temporary supporting blocks 102 are provided, mounted upon screws 104 set in suitable bearings 106. When the device is temporarily stopped the operator applies a wrench to the screws 108 thus setting the blocks 102 up against the wall of the cylinder, thus supporting it in its proper axial position until such time as it is ready to start when the operator moves the screws in the opposite direction thereby permitting power to be applied to the cylinder to readily start it up without danger of damage being done. As heretofore stated, the end 19 of the cylinder enters an opening or recess 110 in the fire box and in line with the opening of the fire box so that gases and hot air from the fire box may pass into the cylinder for the purposes set forth. In order to protect this end 19 of the cylinder the exterior circumference 112 of this opening 18 of the fire box is made smaller than the cylinder so that it protects the end 19 of the cylinder in the same way that the cast iron plates protect the adjacent end 100 in the manner heretofore described.

The fire box roof is constructed, as illustrated in detail on Figs. 1, 9 and 10, of a plurality of parallel bungs 114 having hinged end members 116 adapted to be detachably secured in the position shown in Fig. 9 by the bolts 120 to hold the fire brick of the roof 122 in place. When these bolts 120 are released the end members 116 swing about the hinges 124 thereby releasing all of the brick 122, permitting them to drop out and allowing others to be put in their places. These bungs are each self contained and can be readily lifted by means of the handle member 126 into and out of the position shown in Fig. 1.

Having thus described the invention, the claims are:—

1. In a device of the class described comprising a cylinder, means for rotating it, means for admitting the hot gases thereto and means for admitting material to be dried thereto; an interior construction comprising a central box shaped member and radial members connecting the box to the side walls of the cylinder whereby passageways for the material to be dried are formed between the box and the wall of the cylinder.

2. A cylinder of the class described comprising at its feed end a plurality of circumferential, angularly placed, feed members; then a longitudinal portion comprising a plurality of radial stirring members running lengthwise of the cylinder; then a portion comprising a center box member and radial members connecting it to the walls of the cylinder and finally a portion in which the section consists of radial members meeting at the center of the cylinder; said various kinds of stirring members being proportioned in length to the dampness of the material entering the device and to its relative dryness as it passes through the device.

3. In mechanism of the class described in combination with a cylinder, means for rotating the same, and a fire box opening into the cylinder, means adjacent to the fire box end of the cylinder adapted to be moved between two different positions in one of which it supports the end of the cylinder and in the other clears it.

4. A cylinder of the class described, comprising at its feed end a plurality of circumferential angularly placed feed members; then a longitudinal portion comprising a plurality of radial stirring members running lengthwise of the cylinder, and having finally near its opposite end a portion in which the section consists of radial members meeting at the center of the cylinder; said various kinds of stirring members being proportioned in length to the dampness of the material entering the device, and to its relative dryness as it passes through the device.

In witness whereof, I have hereunto subscribed my name in the presence of two witnesses.

FRED A. RUNDLE.

Witnesses:
G. R. BRANDON,
A. T. WHITING.